3,073,092
COOLING OF VAPOUR-PHASE OXIDATION PRODUCTS

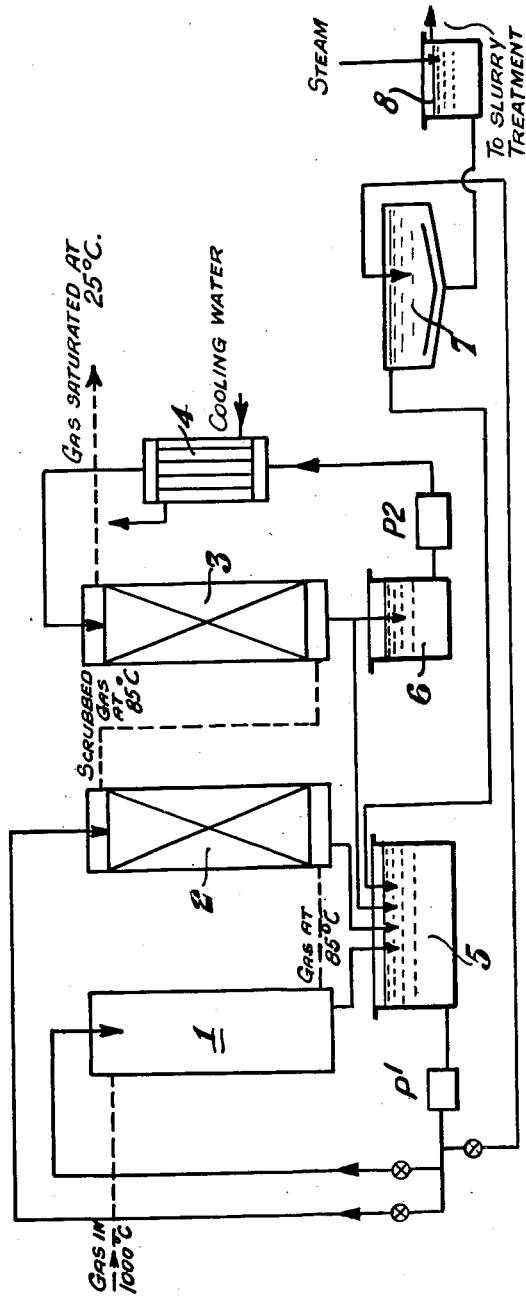

Robert William Ancrum, Saint-Germain-en-Laye, Paris, France, and James Dennis Groves, Fairfield, Stockton-on-Tees, England, assignors to British Titan Products Company Limited, Durham, England, a corporation of Great Britain
Filed Dec. 28, 1959, Ser. No. 862,240
29 Claims. (Cl. 55—22)

This invention comprises an improved process for recovering the oxides produced by the vapour-phase oxidation of metal chlorides, e.g. titanium tetrachloride or ferric chloride, or of metalloid chlorides e.g. silicon tetrachloride.

The products of the oxidation reaction emerge at high temperatures which, in the case of oxidising titanium tetrachloride, are of the order of 500–1200° C., usually between 700 and 1000° C. They consist essentially of a suspension of the oxide in chlorine and other residual gases dependent on the reactants fed to the furnace, that is they may contain vapour of the chloride and oxygen and, if air is used as the oxidising gas, there will be nitrogen and other residual gases of the atmosphere. Further, if auxiliary chemical reactions occur within the furnace there will be products of combustion, such as carbon monoxide and carbon dioxide. There will usually also be, due to the presence of small quantities of water in the original reactant gases, a resultant content of hydrochloric acid in the gases.

It will be appreciated that in the recovery of the oxide in suspension it is also desirable, or even essential, to recover the chlorine values. The recovery of the oxide and chlorine from the gases involves a cooling operation so that the gas stream may be more easily handled and the solids separated therefrom.

Many suggestions have been made for the cooling of the reaction gases which, on a small scale, have included methods of indirect cooling. On a large scale, due to the corrosive nature of the gases, direct cooling has proved essential in the higher temperature ranges. Cooling, for instance, has been suggested by the addition of liquid chloride, e.g. titanium tetrachloride, or liquid chlorine. It will be obvious that there are disadvantages in either of these procedures. In the case of titanium tetrachloride there is a problem of uncontrolled oxidation of the chloride vapour at the higher temperature levels. There is also the problem of recovery of the titanium chloride liquid from the titanium dioxide, after such cooling. In the case of the addition of liquid chlorine there is the objection that whilst it will increase the chlorine content of the gases tending to richer gases, it will, at the same time, lead to an increase in plant necessary either for the absorption of the chlorine or for recovery by liquefaction.

A more favoured method for cooling is the recycling of tail gases as obtained after the separation of the oxide and usually before collection or separation of the chlorine values. This, however, whilst having certain advantages such as avoidance of excessive aggregation of particles of the oxide, has draw-backs in that it entails the recycling of highly corrosive gases and the separation of the oxide particles from much larger volumes of gases necessitating larger equipment. Furthermore, cooling in this way, unless excessive volumes of gases are used, is not entirely satisfactory since the resultant mixture is often at a temperature necessitating further cooling, usually of an indirect nature, through metal equipment. This requires further expensive plant and introduces other attendant difficulties in regard to handling because the metal surfaces have to be maintained in a clean condition in order to get the maximum conductivity therethrough.

Various mechanical contrivances for cooling have also been suggested but these are unsatisfactory for various reasons which do not require to be enumerated herein.

In the methods as generally described above, the oxide which is removed either with or without prior electrostatic precipitation, is usually separated by cyclones.

The oxide obtained by any of these methods, even after removal of the gaseous product of reaction and additional treatment by air or steam to remove the adsorbed gases, is usually still contaminated with certain acidic materials such as hydrochloric acid which render the oxide sufficiently acid, i.e. as examined by pH measurement, as to be objectionable for many forms of use e.g. as a pigment. It therefore becomes essential that such products receive a subsequent treatment. Methods of neutralising this acidity have been put forward, and, whilst they may achieve the object, they still constitute separate operations, all of which are preferably to be avoided, if possible. Frequently, such treatments involve the employment of moisture with a subsequent drying operation.

The oxides, e.g. pigments, made by these procedures, whether after-treated or not to remove the residual acidity, are found to have a certain degree of aggregation which, when the ultimate product is dry, tends to produce unsatisfactory results in the pigment vehicles as, for instance, a grittiness or a loss of gloss when admixed with oil media in paint. Thus, it becomes desirable to have a final grinding operation before the pigment is in a state suitable for these more particular uses.

The basis of the present invention is the finding that many of the problems, as outlined above, associated with the cooling and separation of oxide and chlorine from the products of vapour-phase oxidation, may be more economically and satisfactorily conducted, if the gases emerging from the reactor are submitted to a chilling or quenching operation which essentially may be described as a drenching or dousing with water. Subsequently, the oxide can be stripped from the gases and recovered in the form of an aqueous slurry which, after suitable dewatering by filtration or other well-known means, is in a form eminently suitable, in the case particularly of titanium dioxide, for wet milling, elutriation, coating and other desirable treatments well known in the art, such treatment being followed by drying and dressing to give a dry neutral pigment. Most importantly, it has also been found that this rapid chilling of the hot gases inhibits the production of hydrochloric acid by the reaction between chlorine and water vapour. Whereas in an equilibrium mixture resulting from equimolar amounts of chlorine and water vapour at a temperature of 1000° C. about 73% of the chlorine would be converted to hydrochloric acid, it has been found that operating according to this invention less than 5% and usually less than 1% of the chlorine contained in the hot gases is in fact converted to hydrochloric acid.

It will be understood therefore that the process of the present invention, for the recovery of oxides produced by the vapour-phase oxidation of chlorides, comprises essentially the step of quenching the product gases with water to cool them so rapidly, from a temperature above at least about 500° C., normally above about 600° C., as to prevent substantial reaction between any of the product gases, more particularly chlorine, and the water. The cooling is preferably to a temperature below 100° C., but all the water used to effect cooling may be evaporated, in which case the final temperature of the cooled product gases will be somewhat higher, e.g. up to 200° C. The chlorine may subsequently be recovered as such, and the less moisture introduced into the gas stream the more economical is the recovery.

The rapid cooling may be effected in a spray-cooling tower and the cooled gases then passed to a scrubbing tower where they are washed with a further quantity of water to scrub out the finely-divided suspended oxide from the gases. This may be conducted by many well-known devices constructed for the removal of fine solids from gases. Equipment for this purpose may vary widely in design and may for instance include principles of cooling, such as by evaporation or direct contact with cool fluid, and of separation by impingement of the solid particles onto droplets or onto wetted solid surfaces.

The water used both for the quenching and the scrubbing may consist of a recycled aqueous slurry of the oxide. It will be appreciated that it is advantageous that water used in the process should be recycled as much as possible rather than that fresh water be employed because this favours the maximum recovery of chlorine from the gaseous products of reaction.

An embodiment of the invention with respect to the production of titanium dioxide by vapour-phase oxidation of titanium tetrachloride will now be described:

The gases emerging from the reactor in which titanium tetrachloride has been reacted with oxygen or oxygen-containing gases to yield titanium oxide and chlorine may contain in addition other gases such as excess oxygen, the residual gases of the atmosphere and, if an auxiliary fuel has been used, gases such as carbon dioxide and some carbon monoxide. These gases, which emerge from the reactor at temperatures from 500–1200° C. usually between 700 and 1000° C. are led into the top of a cooling tower into which water is also sprayed from the top of the tower. Alternatively the hot gases may be led into the base of the cooling tower to flow counter-current to the water quench. The gases are thereby quenched quickly to a temperature below 100° C. The time of cooling of the hot suspension of titanium dioxide is usually less than 3 minutes, preferably less than 1 minute, or between about 0.04 to 1 minute, measured from the time of contact of the water with the hot suspension or mixture. The quantity of water contacting the hot mixture to insure the desired rate of cooling may vary between about 8 and 60 pounds of water per pound of titanium dioxide in the hot suspension or mixture.

After quenching, the gases pass to a scrubbing tower irrigated with water or a recycled slurry of titanium oxide to strip the suspended titanium oxide pigment from the gases. The gases emerging from the scrubbing tower are at temperatures of the order of 40–95° C. and these cases may be subsequently further chilled to temperatures of the order of 20° C. The resultant gases which are by this means freed from large excess of water vapour may then be further dried prior to either the absorption or recovery by liquefaction of the chlorine constituent.

Following the latter, the gases are passed through suitable alkaline-reacting scrubbing towers or other suitable absorption equipment for the removal of the remaining noxious gases prior to discharge to the atmosphere or, if the gases are rich enough in oxygen, they may be recirculated back to the vessel in which the titanium tetrachloride and oxygen are reacted.

It will be realised that the cooling of the gases and the removal of the finely-divided oxide suspension from the gas stream, according to this invention, can be accomplished using plant, varying in detail of design and arrangement but the general method is illustrated, by way of example, by reference to the accompanying drawing showing a diagrammatic flow sheet.

The hot gases bearing titanium oxide in suspension enter the top of a spray-cooling tower 1 which is constructed in mild steel and lined with acid resisting brick. A slurry of titanium oxide in water at a temperature of about 85° C. is pumped, by a pump $P_1$, from a recirculation tank 5 to the top of the cooling tower and is introduced into the tower through a spray device. The hot gases encountering the spray of aqueous slurry are cooled to a temperature of about 85° C. by the evaporation of water and issue from near the bottom of the tower at this temperature and saturated with water vapour. A small portion of the titanium oxide borne in suspension by the gases may be washed out in the spray-cooling tower and the slurry flows from the bottom of the tower back to the recirculation tank 5.

The cooled gases issuing from the spray-cooling tower pass to the bottom of a scrubbing tower 2. This tower is constructed of mild steel and is lined with acid-resisting brick and packed with 2″ ceramic rings. The tower is irrigated with aqueous slurry pumped from the recirculation tank 5, the slurry being at a temperature of about 85° C. While passing upwards through this scrubbing tower the gases are stripped of substantially the whole of the titanium oxide borne in suspension by the percolating aqueous slurry which flows out of the bottom of the tower back to the recirculation tank 5.

The gases issuing from the top of the scrubbing tower, now substantially free from suspended pigment but still at a temperature of about 85° C. and saturated with water vapour, are led to the bottom of a grid-packed gas-cooling tower 3. Cold water is sprayed into the top of this cooling tower in amount sufficient to cool the gases to a temperature of about 25° C. By this cooling, part of their water vapour burden is condensed and the gases issue from the top of the tower cooled to a temperature of about 25° C. and saturated with water vapour at this temperature and pass to equipment, not shown, for drying and recovery of chlorine.

The cooling water flows from the bottom of the cooling tower to a recirculation tank 6 from which it is pumped back, by a pump $P_2$, to the top of the gas-cooling tower through the heat exchanger 4. This heat exchanger can be of any conventional design but must be of sufficient capacity to cool the circulating water to at least about 25° C., as it is at this point that the bulk of the heat is removed from the system. The heat is removed by circulating cold water over the heat exchanger surfaces.

During their passage through the gas-cooling tower the gases will be stripped of any titanium oxide which may remain in suspension. It is preferable, of course, that all the titanium oxide should be removed before this point as even though the recirculating water may only contain a small amount of pigment in suspension, this will tend to foul the heat exchanger surfaces of the heat exchanger 4. The cooling water circulating between recirculation tank 6, the heat exchanger 4 and gas-cooling tower 3, if and when required, can be purged to recirculation tank 5.

The pigment collected in the form of an aqueous slurry in recirculation tank 5 is pumped to a Dorr thickener 7 and the thickened underflow pumped to tank 8. Here, the thickened slurry is treated with steam to remove dissolved chlorine from the water and the slurrry then goes forward for further conventional treatment as desired. The overflow from the Dorr thickener 7 is pumped back to recirculation tank 5. It has been found very convenient to spray the hot gases with an aqueous slurry of concentration 50 gms./litre $TiO_2$, but other concentrations can be used, for instance concentrations of up to 250 gms./litre $TiO_2$.

The washing, scrubbing and cooling water and slurries used in the spray-cooling tower 1, scrubbing tower 2 and gas-cooling tower 3 all become saturated with chlorine, but it will be seen that these liquids are recirculated within the scrubbing and cooling system and the loss of chlorine is small.

The following example is illustrative of the invention:
480 lbs. per hour of vapourised titanium tetrachloride, at a temperature of 150° C. and 122 lbs. per hour of oxygen, at a temperature of 100° C. are fed to a vertical cylindrical refractory lined reaction vessel which has been preheated to a temperature of 1100° C.

The exit gas stream consisting of finely divided titanium oxide suspended in chlorine and excess oxygen at a temperature of 1000° C. is led directly to a cooling tower. This is a brick-lined, tower 2 ft. 6 ins. internal diameter and 10 ft. high, and the gases are quenched by spraying concurrent to the gas stream with an aqueous slurry containing 50 gms./litre TiO$_2$. The slurry is sprayed into the cooling tower through two nozzles at a pressure of 20 pounds per sq. inch above atmospheric pressure and at a rate of 2.0 cubic metres per hour.

The gases issuing from the cooling tower at a temperature of 60° C. and still containing the finely-divided titanium oxide pigment in suspension, are then led directly to the base of a scrubbing tower. This is a vertical tower one foot six inches in internal diameter and packed for the first 10 ft. with 2 inch Raschig rings and for a further one foot with 1 inch rings and irrigated with the aqueous slurry of titanium oxide at a rate of 2.7 inch metres per hour. The scrubbed gas leaves the top of the tower at a temperature of 45° C. and substantially stripped of its pigment content. After drying the chlorine may be recovered from the gas by conventional means.

The slurry for feeding to the spray tower and the scrubbing tower is derived from a common tank and part of the slurry is periodically pumped out, and the titanium oxide pigment separated by settling and filtration, the filtrate being returned to the slurry tank and the volume maintained by make-up water as necessary.

A mass balance over the cycle will show that only 1.25% of the chlorine value of the titanium tetrachloride fed to the reactor has been converted to hydrochloric acid, the whole of this being present in the recycled slurry.

Although the process has particularly been described in connection with the hot reaction products produced by the vapour phase oxidation of titanium tetrachloride, it should be understood that this process may be used to cool other reaction products resulting from the vapour phase oxidation of metal chlorides. For example, the herein described process is also applicable to the reaction products resulting from the vapour phase oxidation of such metal chlorides as ferric chloride, silicon tetrachloride, and chlorides of those metallic elements in groups 3 and 4 of the periodic system which form volatile metal chlorides.

This application is a continuation-in-part of copending U.S. application, Serial No. 25,814, filed November 23, 1959, now abandoned.

What we claim is:

1. In the process of treating a suspension of titanium dioxide in gases comprising chlorine for recovery of said dioxide therefrom, said suspension having a temperature of at least 500° C., the improvement which comprises contacting said suspension with enough water to cool the suspension below about 200° C., rapidly enough to prevent substantial formation of hydrogen chloride while limiting the amount of said water so that a substantial portion of the cooled titanium dioxide remains suspended in the gases.

2. In the process of recovering titanium dioxide from a gaseous suspension containing chlorine, formed from the oxidation of titanium tetrahalides, and having a temperature of at least 500° C., the improvement which comprises contacting said suspension with a sufficient amount of water to cool the suspension below about 200° C. rapidly enough to prevent substantial formation of hydrogen chloride while thereby providing that a substantial portion of the cooled titanium dioxide remains suspended in the gases, contacting the cooled suspension with additional water to form an aqueous slurrry of titanium dioxide, separating the slurry from the cooled gases and recovering the titanium dioxide from the slurry.

3. In the process of recovering titanium dioxide from a hot gaseous suspension containing chlorine, formed from the oxidation of titanium halides, and having a temperature of at least 500° C., the improvement which comprises contacting said suspension with a sufficient amount of a coolant comprising an aqueous slurry of titanium dioxide to cool the suspension below about 200° C. rapidly enough to prevent substantial formation of hydrogen chloride, while providing that a substantial portion of the cooled titanium dioxide remains suspended in the gases, contacting the cooled suspension with additional water to form an aqueous slurry of titanium dioxide, separating the slurry from the cooled gases, recycling a portion of the separated slurry to the coolant, and recovering titanium dioxide from the remaining portion of the separated slurry.

4. The process of claim 3 wherein the hot suspension is cooled below about 100° C.

5. In the process of treating a suspension of titanium dioxide in gases comprising chlorine for recovery of said dioxide therefrom, said suspension having a temperature of at least 500° C., the improvement which comprises contacting said suspension with enough water to cool the suspension below about 200° C. within 3 minutes from the time of contact, thereby preventing substantial formation of hydrogen chloride, while limiting the amount of said water so that a substantial portion of the cooled titanium dioxide remains suspended in the gases.

6. The process of claim 5 wherein the suspension is cooled below about 200° C. within 1 minute from the time of contact of said hot suspension with water.

7. The process of claim 6 wherein the hot suspension is cooled below 200° C. between about 0.04 to 1 minute from the time of contact of the water with the hot suspension.

8. In the process of recovering titanium dioxide from a gaseous suspension containing chlorine, formed from the oxidation of titanium tetrahalides, and having a temperature of at least 500° C., the improvement which comprises contacting said suspension with a sufficient amount of water to cool the suspension below about 200° C. in less than 3 minutes from the time of contact of said water with said suspension, thereby providing that at least 95 percent by weight of said chlorine is unreacted with the water, while thereby providing that a substantial portion of the cooled titanium dioxide remains suspended in the gases, contacting the cooled suspension with additional water to form an aqueous slurry of titanium dioxide, separating the slurry from the cooled gases and recovering the titanium dioxide from the slurry.

9. In the process of treating a suspension of titanium dioxide in gases comprising chlorine for recovery of said dioxide therefrom, said suspension having a temperature of at least 500° C., the improvement which comprises contacting said suspension with enough water to cool the suspension below about 200° C. in less than 1 minute from the time of contact of said water with said hot suspension, thereby providing that at least 95 percent by weight of said chlorine contained within said suspension remain unreacted, while limiting the amount of said water so that a substantial portion of the cooled titanium dioxide remains suspended in the cooled gases.

10. In the process of treating a suspension of titanium dioxide in gases comprising chlorine for recovery of said dioxide therefrom, said suspension having a temperature of at least 500° C., the improvement which comprises contacting said suspension with enough water to cool the suspension below about 200° C. in less than 1 minute from the time of contact of said water with said hot suspension, thereby providing that at least 90 percent by weight of said chlorine contained within said suspension remain unreacted, while limiting the amount of said water so that a substantial portion of the cooled titanium dioxide remains suspended in the cooled gases.

11. In the process of recovering titanium dioxide from a hot gaseous suspension containing chlorine, formed from the oxidation of titanium halides, and having a temperature of at least 500° C., the improvement which comprises contacting said suspension with a sufficient amount of a coolant comprising an aqueous slurry of titanium dioxide to cool the suspension below about 200° C. less than 3 minutes from the time of contact of the coolant with said suspension, thereby providing that at least 95 percent by weight of said chlorine of said suspension remain unreacted with the water present in said coolant, while providing that a substantial portion of the cooled titanium dioxide remains suspended in the gases, contacting the cooled suspension with additional water to form an aqueous slurry of titanium dioxide, separating the slurry from the cooled gases, recycling a portion of the separated slurry to the coolant, and recovering titanium dioxide from the remaining portion of the separated slurry.

12. In the process of treating a suspension of titanium dioxide in gases comprising chlorine for recovery of said dioxide therefrom, said suspension having a temperature of at least 500° C., the improvement which comprises contacting said suspension with about 8 to 60 pounds of water per pound of titanium dioxide in said suspension to quickly cool said suspension to a temperature below about 200° C. within 1 minute after contact of said suspension with said water, thereby providing that at least 95 percent by weight of the chlorine remains unreacted with the water, while maintaining a substantial portion of the resulting cooled titanium dioxide suspended in the gases.

13. The process of claim 3 wherein the coolant comprises chlorine saturated water.

14. In the method of cooling a mixture comprising metal oxide suspended in gases comprising chlorine, the improvement which comprises contacting said mixture with an amount of an aqueous medium sufficient to cool the mixture rapidly enough to prevent substantial formation of HCl and thereby producing cooled gaseous chlorine.

15. In the method of cooling a mixture comprising metal oxide suspended in gases comprising chlorine formed by the oxidation of the corresponding metal chloride, and having a temperature of at least 500° C., the improvement which comprises contacting said mixture with a sufficient amount of an aqueous medium rapidly enough to cool the mixture below about 200° C. without substantial formation of HCl and recovering the resulting cooled chlorine.

16. The method of claim 15 wherein the mixture is cooled below about 100° C.

17. The method of cooling a mixture comprising metal oxide suspended in gases comprising chlorine formed by the oxidation of a corresponding metal chloride, and having a temperature of at least 500° C., the improvement which comprises contacting said mixture with a sufficient amount of an aqueous medium rapidly enough to cool the mixture below about 200° C. and prevent at least 95 percent by weight of said chlorine from reacting with water of the aqueous medium and separating water from the resulting cooled chlorine.

18. The process of claim 17 wherein at least 99 percent by weight of said chlorine is prevented from reacting with water of the aqueous medium.

19. The method of claim 18 wherein the metal oxide is titanium dioxide.

20. The method of claim 14 wherein the metal oxide is titanium dioxide.

21. The method of claim 20 wherein the aqueous medium is water.

22. The method of claim 20 wherein the aqueous medium is an aqueous slurry of titanium dioxide.

23. The method of claim 15 wherein the metal oxide is titanium dioxide.

24. The method of claim 23 wherein the amount of aqueous medium is sufficient to rapidly cool the mixture below 100° C. and prevent substantial formation of hydrogen chlorine.

25. The method of claim 17 wherein the metal oxide is titanium dioxide.

26. The method of claim 25 wherein the amount of aqueous medium is sufficient to rapidly cool the mixture below about 100° C. within 3 minutes from the time of contact and prevent at least 95 percent by weight of said chlorine from reacting with water of the aqueous medium.

27. The method of claim 14 wherein the aqueous medium is water.

28. The method of claim 14 wherein the aqueous medium is an aqueous slurry of titanium dioxide.

29. The method of claim 17 wherein the mixture is cooled below about 200° C. within 1 minute from the time of contact.

References Cited in the file of this patent

UNITED STATES PATENTS

| | | |
|---|---|---|
| 2,833,627 | Krchma | May 6, 1938 |
| 2,849,083 | Nelson et al. | Aug. 26, 1958 |
| 2,899,278 | Lewis | Aug. 11, 1959 |
| 2,909,409 | Gregory | Oct. 20, 1959 |
| 2,937,928 | Hughes et al. | May 24, 1960 |